US012762823B2

(12) United States Patent
Agarwal et al.

(10) Patent No.: US 12,762,823 B2
(45) Date of Patent: Oct. 13, 2026

(54) TOROIDAL SEGMENTATION OF REPEATING PATTERNS IN IMAGES

(71) Applicant: Adobe Inc., San Jose, CA (US)

(72) Inventors: Vineet Agarwal, Bangalore (IN); Vivek Agrawal, Noida (IN); Tarun Beri, Uttar Pradesh (IN); Matthew Fisher, San Carlos, CA (US)

(73) Assignee: Adobe Inc., San Jose, CA (US)

( * ) Notice: Subject to any disclaimer, the term of this patent is extended or adjusted under 35 U.S.C. 154(b) by 272 days.

(21) Appl. No.: 18/390,696

(22) Filed: Dec. 20, 2023

(65) Prior Publication Data

US 2025/0209779 A1 Jun. 26, 2025

(51) Int. Cl.

| | |
|---|---|
| ***G06V 10/00*** | (2022.01) |
| ***G06T 3/4038*** | (2024.01) |
| ***G06T 7/10*** | (2017.01) |
| ***G06T 11/60*** | (2006.01) |
| ***G06V 10/26*** | (2022.01) |

(52) U.S. Cl.

CPC ............ *G06V 10/26* (2022.01); *G06T 3/4038* (2013.01); *G06T 7/10* (2017.01); *G06T 11/60* (2013.01); *G06T 2207/20221* (2013.01)

(58) Field of Classification Search

CPC ......... G06V 10/26; G06T 3/4038; G06T 7/10; G06T 11/60; G06T 2207/20221; G06T 7/11

See application file for complete search history.

(56) References Cited

U.S. PATENT DOCUMENTS

| | | | | |
|---|---|---|---|---|
| 11,295,499 B1 * | 4/2022 | Beri | .......................... | G06T 3/02 |
| 2021/0312590 A1 * | 10/2021 | Beri | ...................... | G06T 3/4084 |
| 2023/0260165 A1 * | 8/2023 | Jain | ......................... | G06T 11/00 345/647 |

OTHER PUBLICATIONS

Wang et al., Deep Generative Model for Periodic Graphs, arXiv:2201.11932v4 Oct. 6 (Year: 2022).*

Unpublished U.S. Appl. No. 17/932,478, filed Sep. 15, 2022—stored in USPTO Image File Wrapper System. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.

(Continued)

*Primary Examiner* — Xiao Liu

(74) *Attorney, Agent, or Firm* — Kilpatrick Townsend & Stockton LLP

(57) ABSTRACT

This disclosure relates to segmenting repeating patterns in images to provide representations of individual objects. For example, a method involves segmenting an input image including a repeating pattern to identify input image regions of a minimal cell. The method further involves representing image regions using nodes of a graph, and defining edges between nodes that represent adjoining image regions. The method also involves identifying, using the graph, portions of toroidally connected image regions and portions of mergeable adjoining image regions. The method additionally involves joining each portion of each mergeable adjoining image region, and unwrapping each portion of each toroidally connected image region. The method also involves rendering or storing each of the resultant image regions as an object from the repeating pattern.

20 Claims, 11 Drawing Sheets

(56) References Cited

OTHER PUBLICATIONS

Unpublished U.S. Appl. No. 18/301,398, filed Apr. 17, 2023—stored in USPTO Image File Wrapper System. In accordance with the Waiver of the Copy Requirements in 37 CFR 1.98 for Cited Pending U.S. Patent Applications, 1287 O.G. 163 (Oct. 19, 2004), the cited, unpublished US Patent Application is available in the IFW and, therefore, not provided.
Cedar Lake Ventures, Inc., "Easily Convert JPG, PNG, GIF files to PDF, SVG, EPS Vectors" Available at https://vectormagic.com/, 2018, accessed Dec. 20, 2023, pp. 1-16.
Felzenszwalb, Pedro F., et al., "Efficient Graph-Based Image Segmentation" International Journal of Computer Vision, vol. 59, Sep. 2004, pp. 1-26.

* cited by examiner

TOROIDAL SEGMENTATION OF REPEATING PATTERNS IN IMAGES

TECHNICAL FIELD

The present disclosure generally relates to graphic design using a computer graphics application. More specifically, but not by way of limitation, the present disclosure relates to techniques for accurately segmenting cells of a repeating pattern in an image to provide accurate graphical representations of individual objects.

BACKGROUND

Vector graphics is one of the most powerful, and versatile tools for graphic design. Vector graphics can be used to represent a wide variety of content, such as icons, logos, fonts, maps, posters, etc. in a resolution independent fashion. A graphics application defines standard path objects for a vector graphical representation. Sometimes, an image is scanned or photographed and converted into a vector graphical representation for editing or modification by a graphics designer using a graphics editing application. If the image consists of a repeating pattern, for example, a pattern for wallpaper, textiles, flooring, etc., computing resources can be saved by storing only one occurrence of the pattern. This representation can then be reused in a new design. Image analysis software can be used to find a minimal cell and the arrangement, where the minimal cell is repeated to make the pattern. The minimal cell can then be saved as an image and/or converted to a vector graphical representation and reused.

SUMMARY

Certain aspects and features of the present disclosure relate to segmenting repeating patterns in images to provide representations of individual objects according to certain embodiments. For example, a method involves segmenting an input image including a repeating pattern to identify input image regions of a minimal cell of the repeating pattern. The method further involves representing each input image region using a node of a graph, and defining an edge between each pair of nodes that represents adjoining image regions. The method also involves identifying, using the graph, portions of toroidally connected image regions and portions of mergeable adjoining image regions of the minimal cell of the repeating pattern. The method additionally involves joining each portion of each mergeable adjoining image region, and unwrapping each portion of each toroidally connected image region to produce resultant image regions for the minimal cell. The method also involves rendering or storing each of the resultant image regions as a graphical object of the repeating pattern.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
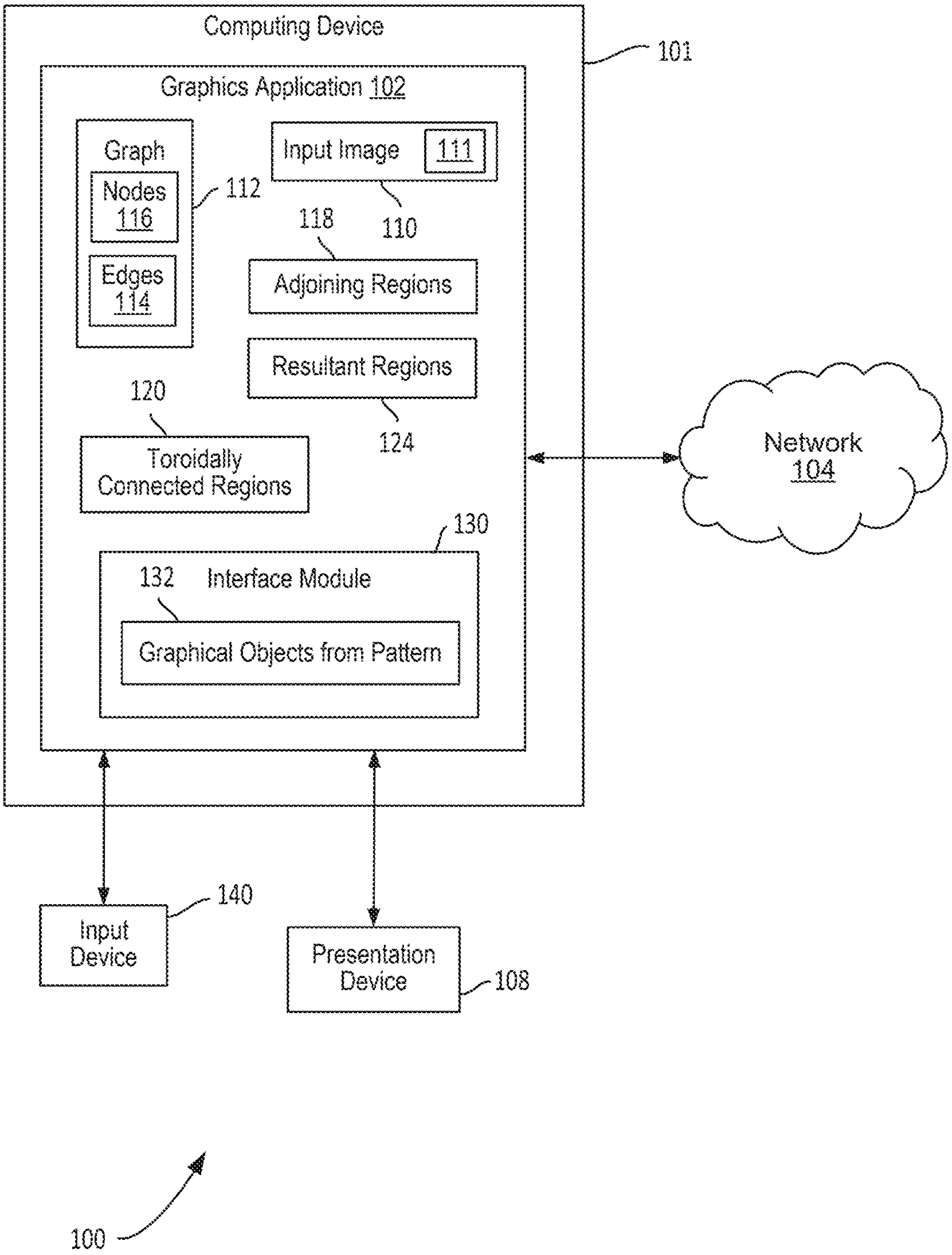
FIG. 1 is a diagram showing an example of a computing environment that segments repeating patterns in images to potentially provide vector graphical representations of objects according to certain embodiments.

Pre-existing or automatically generated images are increasingly being used to produce graphical designs. Instead of starting from a blank canvas, graphic artists are using existing images as a starting point. One important category of images is those with recurring units in well-understood arrangements forming grid or radial patterns, for example, images of tiling, textiles, carpet, wallpaper, architectural features, etc. To make use of such an image, a software algorithm can be used to find a minimal cell, the arrangement of objects in which is repeated to make the pattern. The minimal cell can then be saved as an image and/or converted to a vector graphical representation and reused.

Most pattern arts find their origin in image space-some are camera captured, some are created in imaging software, while some can be generated by AI techniques such as those using deep neural networks. Image formats are static and not much structural editing can be performed on them easily. Designers therefore frequently vectorize them to enable geometry and configuration editing. This process is greatly assisted by deciphering the minimal cell and its repeating configuration (grid or radial), thereby requiring vectorization only for the minimal cell and not for the entire image. However, this technique can mask limitations by reusing a minimal cell's vectorized representation for all repetitions in the pattern.

A minimal cell can be composed of multiple human-perceivable objects without any clear rectangular (for a grid pattern) or pie shaped (for a radial pattern) separation between adjacent repetitions. Such patterns frequently occur because original patterns are created with multiple objects, or because designers superimpose multiple patterns onto each other. Because of high density or artistic arrangement of the objects depicted in such patterns, there are not enough gaps available to make rectangular or pie shaped cuts without breaking user facing objects into multiple parts, compromising any subsequent editability. Further, since a minimal cell is treated as a single unit to vectorize, the generated output can be an unorganized collection of paths. It is a tedious exercise to locate and select the desired paths from the potentially massive collection of small paths produced by vectorization of such a pattern.

Existing tools to vectorize pattern images focus on analyzing color variations in order to create minimum number of Bezier paths. However, these solutions often cut through objects wrapping at boundaries (left, right, top, or bottom) of the minimal cell. The fragments join and look complete when the minimal cell is repeated in the pattern's configuration (in the raster domain), but when vectorized, these solutions produce unwanted boundaries and Bezier paths piercing the objects. These effects are difficult to remove without significant manual effort, compromising the usability of vectorized cells in new designs.

Embodiments described herein address the above issues by programmatically isolating the minimal cell into independent and complete user perceived units. Such a collection can include, as an example, vectorized, superimposed grid or radial patterns free from artefacts and stitch lines. The disclosed technique creates object segments on the minimal cell and joins adjacently placed segments (disregarding the ones comprising the background) into connected components. To handle objects that are "toroidally connected," or that wrap around the ends of the minimal cell (left and right boundaries, top and bottom boundaries), a toroidal subsumption determines whether a component on the left edge is subsumed by one on the right edge of the pattern cell and if a component placed on right edge is completely connected to another component placed at the left edge of the pattern cell. These components are joined to form a single component (and assigned the same identifier, for example, a color). Top and bottom edges are treated the same way. A component can also be formed, if necessary, by joining multiple components on all four edges of the pattern cell. After joining, the image can be partitioned into non-overlapping (or atomic) units that can be independently converted into artefact-free grid and radial patterns. The term "toroidal" in this context is used because the portions of an object that is intersected or cut by a cell boundary would form the whole object if the cell were wrapped into a toroidal shape by bringing the relevant boundaries together; or because it's as if the object extended in some way around the "back" of the cell.

For example, an image with a repeating pattern is loaded into a graphics application. The graphics application may receive an input to direct the graphics application to locate a minimal cell and isolate objects of the repeating pattern represented. The graphics application segments the image to identify regions of the minimal cell and stores a graph, which represents each region using a node. The application defines an edge between each pair of nodes that represents adjoining image regions. The application also identifies, using the graph, portions of toroidally connected image regions and portions of mergeable image regions of the minimal cell. The graphics application joins each portion of the mergeable image regions (adjacently placed segments) and unwraps each portion of the toroidally connected image regions to produce resultant image regions for the minimal cell.

Each resultant image region corresponds to a graphical element of the repeating pattern. For example, each may correspond to a graphic of an animal, plant, person, or object. As another example, each may correspond to a feature of a pattern of interlocking tiles, triangles, etc. The pattern may have a combination of these kinds of features that become individually and accurately represented. In some examples, the graphics application can process the minimal cell of the repeating pattern on a row-by-row or column-by-column basis to define the edge between each pair of nodes. A radially repeating pattern can be transformed to a pseudo grid pattern prior to segmenting the input image in order to use the same technique to isolate graphical elements of a radially repeating pattern. The resultant image regions can be rendered or stored as individual graphical objects for maximum versatility. Alternatively, graphical objects can be grouped into a pattern as needed. Isolated graphical objects can be used in the image domain or converted into vector graphs. For the latter, the technique described herein may be implemented within a vector graphics editing application.

The use of object segmentation on the minimal cell, followed by joining adjacently placed segments into connected components and unwrapping objects at the ends of the minimal cell achieves accuracy of the representation of the graphical objects in the pattern. Among other benefits, this technique provides for a clean image of each graphical element of the input pattern. The resultant graphical element can be vectorized if needed without creating unwanted artifacts or extra Bezier paths.

FIG. 1 is a diagram showing an example of a computing environment 100 that segments repeating patterns in images to potentially provide vector graphical representations of objects according to certain embodiments. The computing environment 100 includes a computing device 101 that executes a graphics application 102, a presentation device 108 that is controlled based on the graphics application 102 and input device 140 that receives input commands, which may include those that cause the graphics application 102 to segment a repeating pattern, toroidally join wrapping segments, extract objects from toroidally connected regions, and/or convert objects to vector graphical representations. The computing devices 101 can be communicatively coupled to other computing devices (not shown) using network 104. Other computing devices may include virtual or physical servers where images and vector graphical designs may be stored, or where updates to the graphics application may be stored and distributed to computing devices 101. In this example, the graphics application 102 includes input image 110. The input image 110 includes a repeating pattern of a minimal cell 111.

Staying with FIG. 1, graphics application 102 also includes a graph 112. Graph 112 includes edges 114 between each pair of nodes 116. The graph is a stored representation of image regions in input image 110. The image regions that are defined by graph 112 include mergeable adjoining image regions 118 and toroidally connected image regions 120 of the minimal cell 111 of the repeating pattern in input image 110. When graphics application 102 joins each portion of each mergeable adjoining image region 118 and unwraps each portion of each toroidally connected image region 120, graphics application 102 produces resultant image regions 124 for the minimal cell.

In the example of FIG. 1, graphics application 102 also includes an interface module 130. In some embodiments, graphics application 102 can produce graphical objects 132 corresponding regions of the minimal cell 111 of the repeating pattern in input image 110. In some embodiments, the graphics application 102 uses an input device 140, for example, a keyboard, mouse, or trackpad, to receive input corresponding one or more of these objects and manipulate the objects or convert one or more of the objects to vector graphical representation for storage or editing. Images of the objects can also, or alternatively, be rendered on presentation device 108.

Figure 2:
FIG. 2 is an example of an image showing a repeating pattern with a minimal repeating cell used to segment the objects in the repeating pattern to potentially provide vector graphical representations of the objects according to certain embodiments.

FIG. 2 is an example of an image 200 showing a repeating pattern with a minimal repeating cell 202 used to segment the objects in the repeating pattern in the image to provide vector graphical representations according to certain embodiments. The pattern has cats, fish and other objects. Notice that the minimal cell in this example is inseparable into a single rectangular unit without cutting through at least one of the user facing objects, for example, the cats. Vectorization of these minimal cells without segmenting some individual objects would produce seam (or stitch) lines through the user perceived objects, potentially making the output unusable any further. This issue results because the designers of the pattern created the image as a collection of multiple superimposed patterns with different objects rather than a single pattern with multiple objects. In such a case, it becomes unnatural to forcibly fit the objects into a single pattern. With some graphical software, the artifacts resulting may not even be manually correctable.

Figure 3:
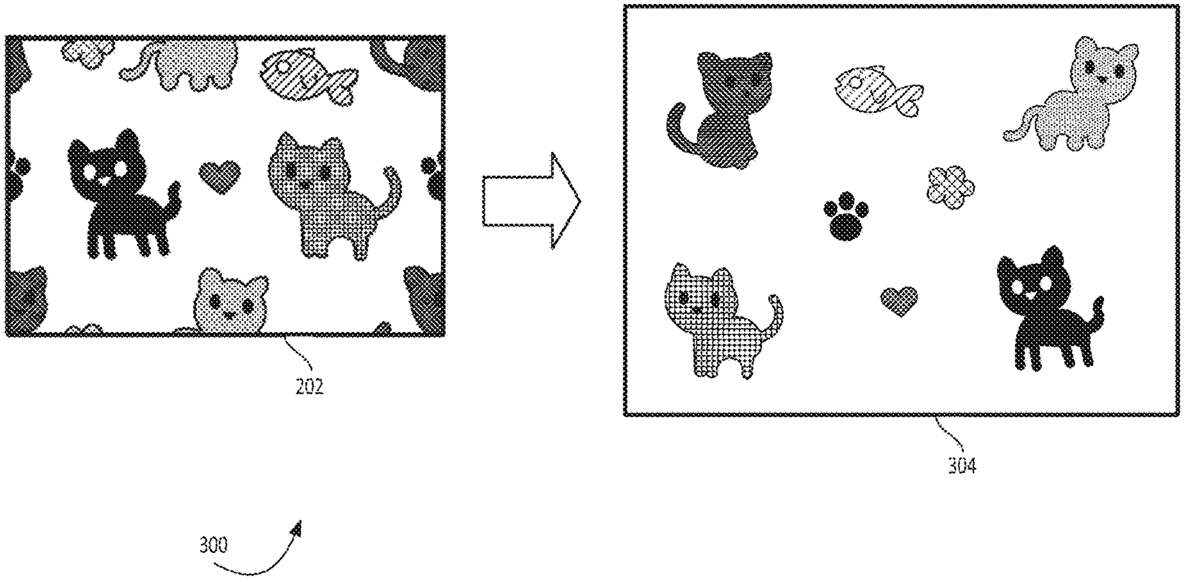
FIG. 3 is an example of objects of the minimal repeating cell of FIG. 2 as distinguished by segmenting to potentially provide vector graphical representations according to certain embodiments.
Figure 4:
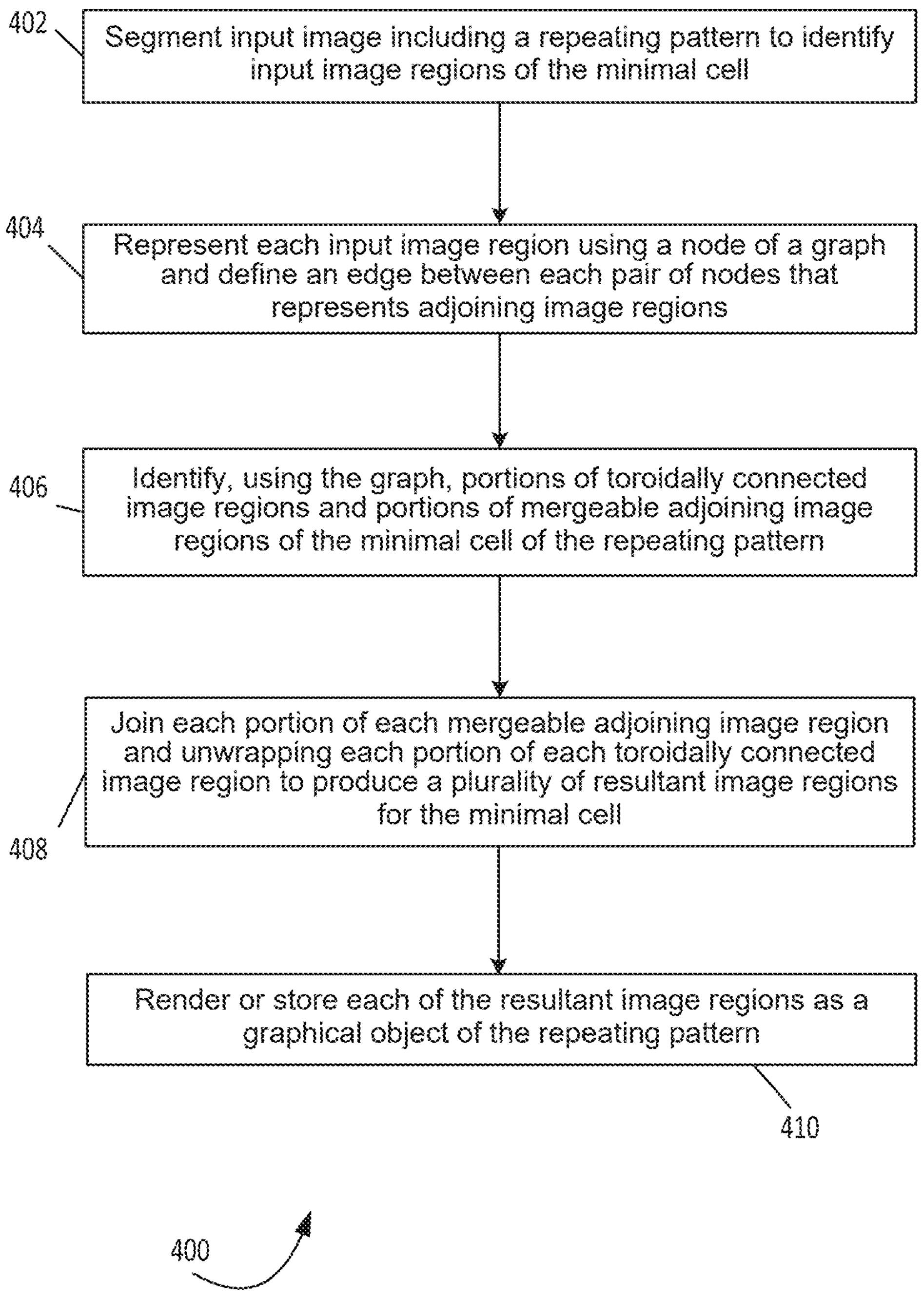
FIG. 4 is a flowchart of an example of a process for segmenting repeating patterns in images to potentially provide vector graphical representations according to certain embodiments.

FIG. 3 is an example 300 of objects of the minimal repeating cell 202 as distinguished by segmenting to potentially provide vector graphical representations according to certain embodiments. Segmented objects 304 include two kinds of cats, flowers, and paws distinguished through toroidal segmentation as described herein. The other cats and the hearts did not need to be toroidally segmented. FIG. 4, below, illustrates a process for segmenting a pattern as shown in FIG. 2 to provide resultant objects, both those that require toroidal segmentation as well as others from within the minimal cell so that the objects can be separately stored or converted to vector graphical representations.

FIG. 4 is a flowchart of an example of a process 400 for segmenting repeating patterns in images to potentially provide vector graphical representations according to certain embodiments. In this example, a computing device carries out the process by executing suitable program code, for example, computer program code for an application, such vector graphics application 102. At block 402, the computing device segments an input image including a repeating pattern to identify input image regions of the minimal cell in the pattern. At block 404, the computing device represents each input image region using a node of a graph and defines an edge between each pair of nodes that represents adjoining image regions. This graph may be stored, as an example as graph 112 with nodes 116 and edges 114. At block 406, the computing device identifies, using the graph, portions of toroidally connected image regions and portions of mergeable adjoining image regions of the minimal cell of the repeating pattern.

Continuing with FIG. 4, at block 408, the computing device joins each portion of each mergeable adjoining image region. The computing device also unwraps each portion of each toroidally connected image region. These two operations produce resultant image regions 124 for the graphical objects in the minimal cell, both toroidal objects and non-toroidal objects. At block 410, the computing device renders or stores each of the resultant image regions as a graphical object of the repeating pattern. The graphical objects may be rendered on presentation device 108. The objects may be stored as vector graphical representations or as images. Vector graphical representations can be edited in a vector graphics editing application. Graphics application 102 can serve as both serve as a vector graphics editing application and provide other graphics functions.

Figure 5:
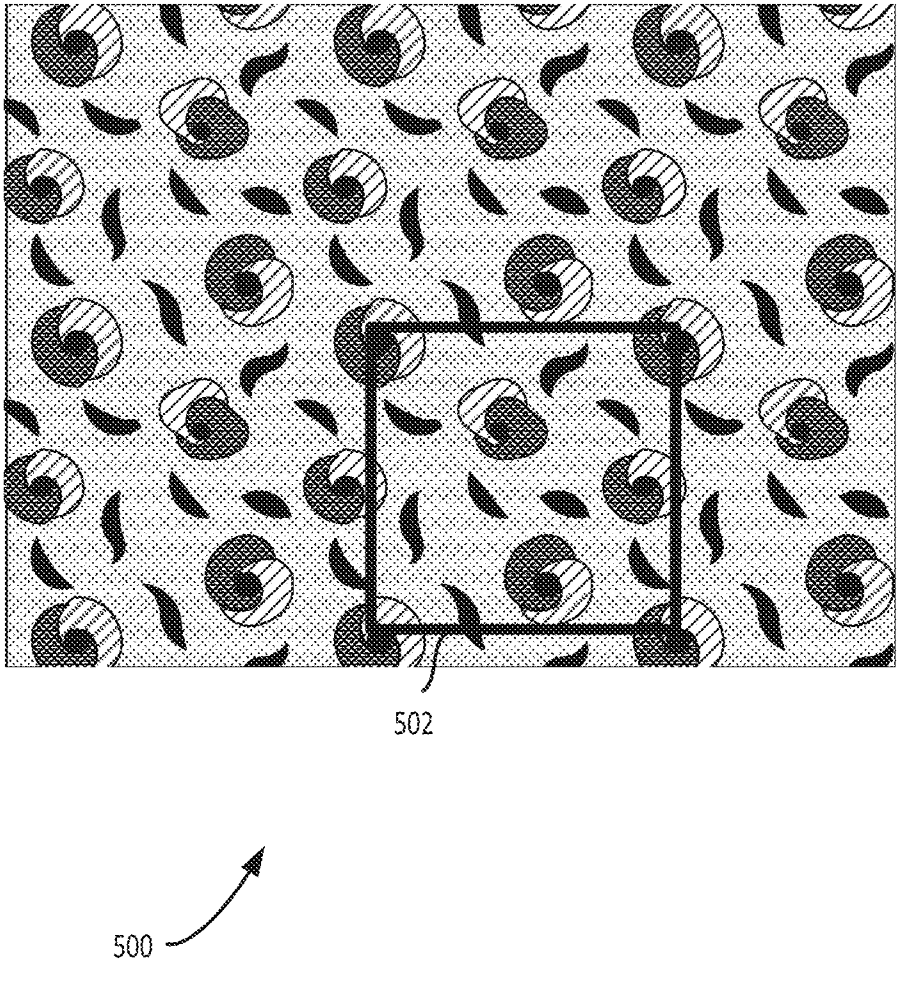
FIG. 5 is another example of a minimal repeating cell used to segment a repeating pattern in an image to potentially provide vector graphical representations according to certain embodiments.

FIG. 5 is another example of an image 500 having a minimal repeating cell 502. Cell 502 is used to segment a repeating pattern in an image to potentially provide vector graphical representations according to certain embodiments. The pattern includes flowers and leaves as objects. Notice that the minimal cell is inseparable into a single rectangular unit without cutting through at least one of the user facing objects, for example, the flowers. Vectorization of these minimal cells without segmenting some individual objects would produce seam (or stitch) lines through the user perceived objects, potentially making the output unusable. This issue may have resulted because the designers of the pattern created the image as a collection of a superimposed pattern of flowers and a superimposed pattern of leaves.

Figure 6:
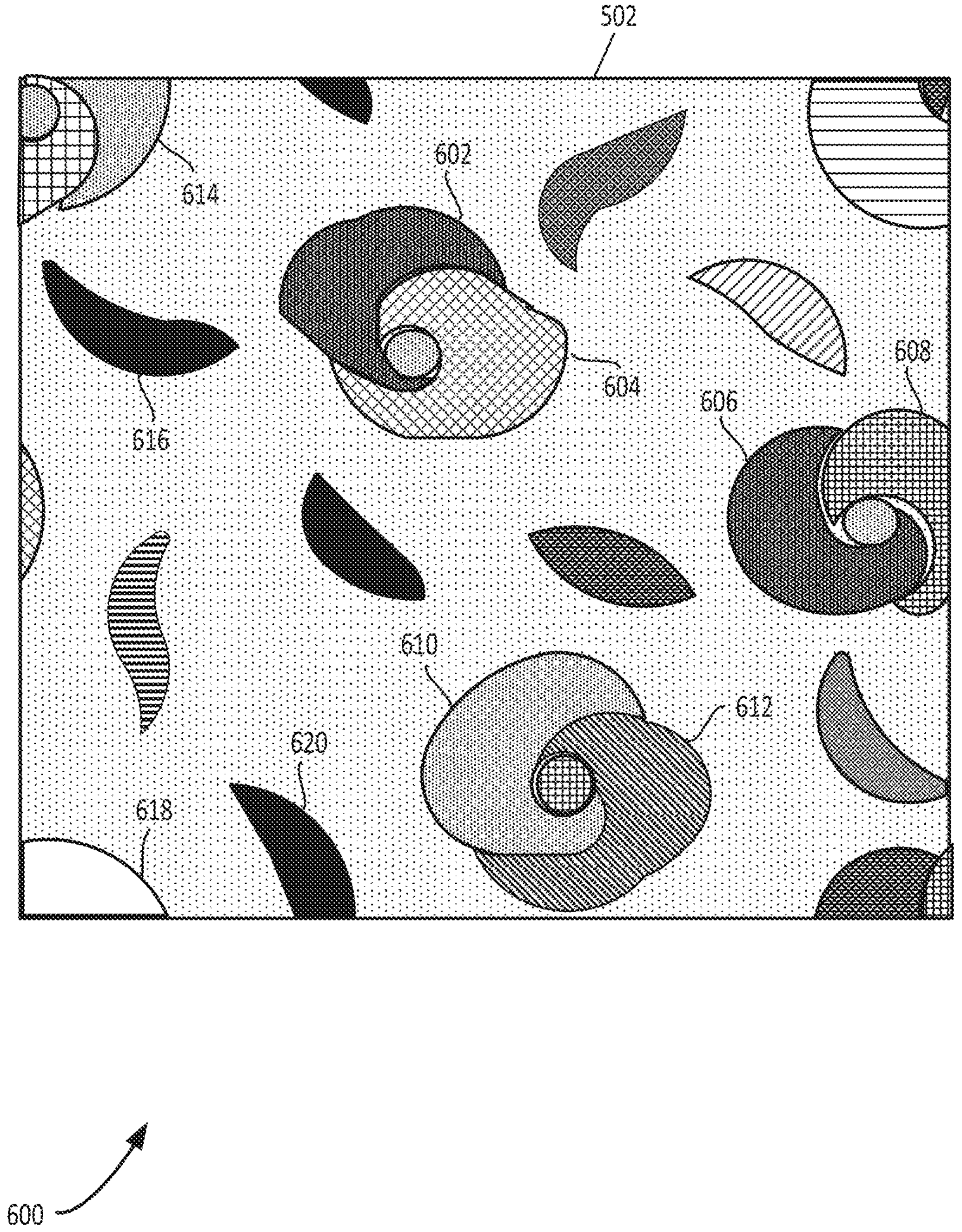
FIG. 6 is an example of regional segmentation of the repeating cell of FIG. 5 in order to potentially provide vector graphical representations according to certain embodiments.

FIG. 6 is an example 600 of regional segmentation of the repeating cell 502 of FIG. 5 in order to potentially provide vector graphical representations according to certain embodiments. Graphics application 102 performs a region-based image segmentation and internally designates probable image regions. In one example, different colors can be used to identify image regions. However, many other designation schemes can be used, for example, different numbers or even words. If colors are used, a graph-based segmentation model, which evaluates color contrast at object boundaries, can be used to create the largest regions possible. However, the heuristics involved can be sensitive to several thresholds in the input image. More regions than would be ideal can be generated. The number of regions produced by the image segmentation can be reduced by merging all adjoining regions.

A region adjoins another if the pixels of the regions appear immediately next to each other. In FIG. 6, region 602 and region 604 are adjoining, as are region 606 and region 608. Region 610 and region 612 are also adjoining. Each pair of mergeable adjoining image regions can be joined to reduce the number of segmented regions for further processing. Each pair of mergeable adjoining image regions becomes a resultant region as described above with respect to FIG. 4. Image region 614, image region 616, image region 618, and image region 620 are all non-adjoining. These regions form complete objects or portions of separate objects.

With every region represented as a logical node in a graph, an edge is created between every pair of nodes that represents adjoining regions. In order to accomplish this, the input minimal cell can be processed row by row (or equivalently column by column processing can be used) starting from the top row. A region (R) can appear in one or more locations in a row. For every appearance, the computing device finds the regions ($R_{left}$ and $R_{right}$) that immediately bound the region being examined (R) on its left ($R_{left}$) and on its right ($R_{right}$). The computing device creates two edges in the graph-one between nodes R and $R_{left}$, and the other between nodes R and $R_{right}$. Note that no edge $R \longleftrightarrow R_{left}$ is created if a region is not "left bound" (where R extends to the minimal cell's left end or when R is left bounded by backdrop). Similarly, no edge for $R \longleftrightarrow R_{right}$ is created if R is not right bound. Once edges are created for all regions found by image segmentation, connected components in the graph can be determined. These graph connections represent regions that should be merged. Thus, for every connected component in the graph, the computing device can pick a random representative color (from colors of nodes in the graph) and paint all regions of the connected component in the chosen color.

The repeating cell shown in FIG. 6 is over segmented in that there are different colored image regions (represented by shading differences here) that are adjoining, but are still represented as different regions. For processing efficiency, the minimum number of regions should be used. Thus, adjoining regions form clusters, which can be identified because they are separated by the color of the background of the cell. The cell as illustrated in FIG. 7, discussed below, shows clusters created by joining adjacently placed segments as determined by areas with only a background color present.

Figure 7:
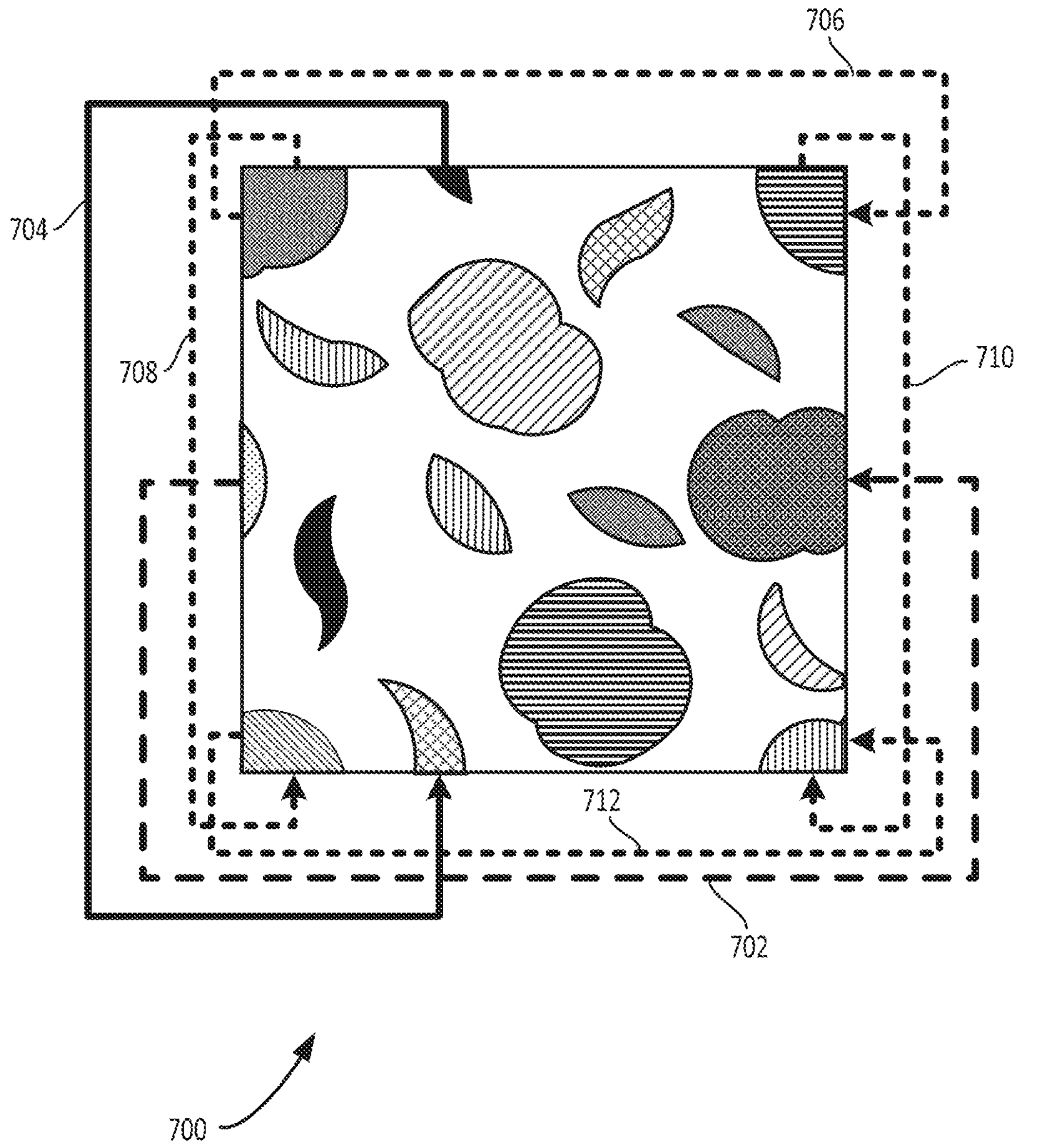
FIG. 7 is an example of toroidally joining wrapping segments of a repeating pattern in the image of FIG. 5 in order to potentially provide vector graphical representations according to certain embodiments.

FIG. 7 is an example 700 of toroidally joining wrapping segments of a repeating pattern in the image of FIG. 5 in order to potentially provide vector graphical representations according to certain embodiments. The computing device finds regions that wrap around the minimal cell's boundaries. Only regions that touch at least one minimal cell boundary need to be processed. Regions that lie fully inside the minimal cell are ignored in this operation. In this example, the computing device processes and joins regions wrapping around left and right boundaries as indicated by arrow 702. The computing device does the same for regions wrapping around top and bottom boundaries, as indicated by arrow 704. The computing device determines if a region appearing on the left boundary can become a part of the corresponding region (if any) on the right boundary had that region been placed further to the left of the left boundary region and not wrapped around. These "joins" only take place when, at all locations where a left boundary region covers the left boundary, the region has the same right boundary counterpart region or vice versa.

Continuing with FIG. 7, in addition to the left-right and top-bottom joins discussed above, corner regions, which include regions that are toroidally both left-right and top-bottom, are also joined. These corner joins in the minimal cell shown in FIG. 7 are indicated by arrow 706, arrow 708, arrow 710, and arrow 712. In one example, all of the joins described above are facilitated by assigning a random color at random for each set of regions to be joined.

Figure 8:
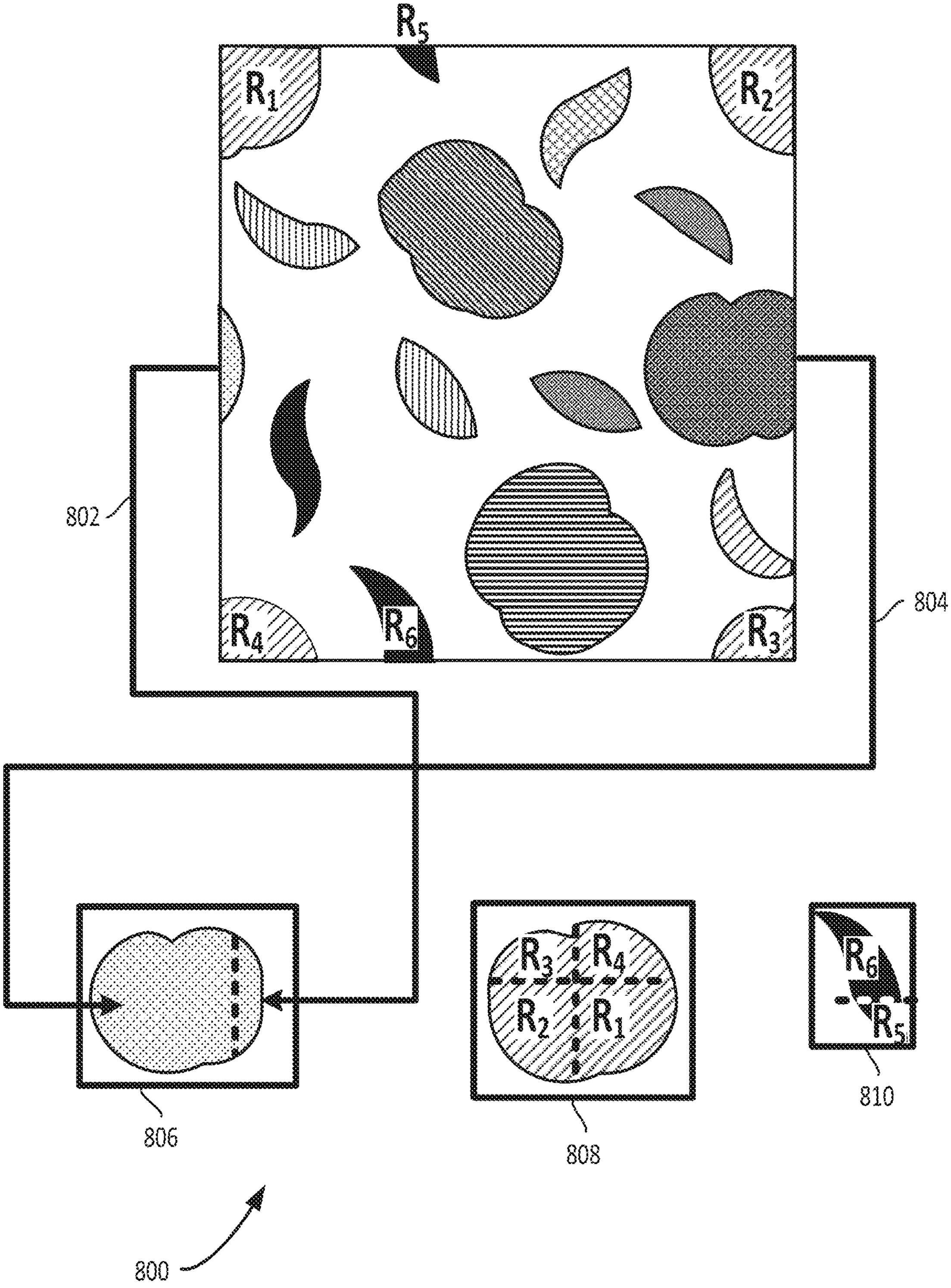
FIG. 8 is an example of extraction of objects from toroidally connected regions of a repeating pattern in the image of FIG. 5 in order to potentially provide vector graphical representations according to certain embodiments.

FIG. 8 is an example 800 of extraction of objects from toroidally connected regions of a repeating pattern in the image of FIG. 5. Note that in these examples, regions that did not touch any minimal cell boundary when the minimal cell was identified were complete and already isolated from others. Such regions are filtered out from the original minimal cell, for example, by having been assigned their unique color in the minimal cell at the stage of the process illustrated in FIG. 8. However, regions that wrapped around and were logically connected in the last step need to be unwrapped before they can be isolated. In order to unwarp these regions, a buffer can be created by the computing device for the entire extents of a region, for example, the extent at the left boundary plus the extent of the right boundary for width, as well as the extent at the top boundary plus extent at the bottom boundary for height.

In example 800, arrow 802 and arrow 804 illustrate the unwrapping of complete object 806 from left and right toroidal regions. Toroidal regions $R_1$ through $R_4$ form object 808. Toroidal regions $R_5$ and $R_6$ form object 810. The region from the right boundary can be placed towards the left and from the left boundary can be placed towards the right. Similarly, a region from the top boundary can be placed towards the bottom and a region from the bottom boundary can be placed towards top.

Figure 9:
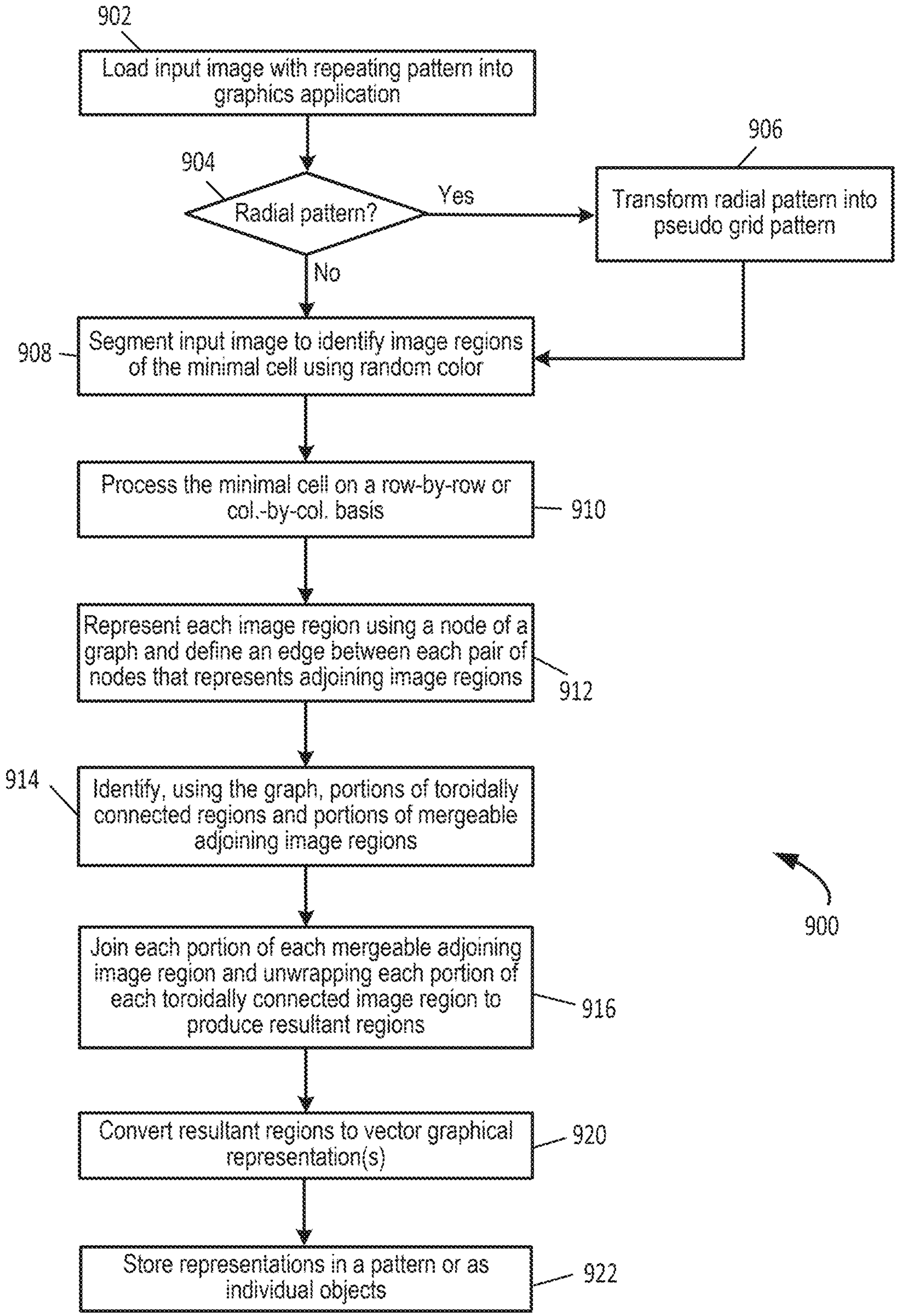
FIG. 9 is a flowchart of another example of a process for segmenting repeating patterns in images to provide vector graphical representations according to certain embodiments.

FIG. 9 is another flowchart of another example of a process 900 for segmenting repeating patterns in images to provide vector graphical representations according to certain embodiments. In this example, one or more computing devices carry out the process by executing suitable program code. At block 902, an image of a surface or object with a repeating pattern is loaded into a graphics application. This input image can be a photograph, or one generated using a graphical design tool. At block 904, the computing device makes a determination as to whether the repeating pattern is radial, or a radially repeating pattern as opposed to a linearly repeating pattern. An example of a radially repeating pattern is discussed below with respect to FIG. 10. The determination can be made by the graphics application through image analysis. Alternatively, the determination can be made by receiving input from a user as to the type of pattern to be segmented. If the image includes a radial pattern, at block 906, the computing device selectively transforms the radial pattern into a pseudo grid pattern. The term "selectively" when used herein to refer to a process or process block indicates the actions may occur or not occur, or partially occur depending on inputs, settings, or conditions as described.

Continuing with FIG. 9, at block 908, the computing device segments the input image to identify image regions of the minimal cell. These regions can each be isolated from each other using a random color, although many other techniques can be used. At block 910, the computing device processes the minimal cell on a row-by-row or column-by-column basis to define the edge between each pair of nodes. As a result, at block 912, the computing device generates a graph that represents each image region using a node and defines edges between pairs of nodes. An edge represents adjoining image regions. At block 914, the computing device uses the graph to identify portions of toroidally connected regions. The computing device also uses the graph to identify portions of mergeable adjoining image regions. At block 916, the computing device joins each portion of each mergeable adjoining image region. The computing device also unwraps each portion of each toroidally connected image region. This joining and unwrapping produces resultant image regions that can be used to identify objects in the minimal cell and define graphical objects to represent them. In this example, the goal is to obtain useable vector graphical representations that can be incorporated into other graphical designs in vector space. Thus, at block 920, the computing device converts the resultant image regions to vector graphical representations. The functions included in blocks 914-920 and discussed with respect to FIG. 9 can be used in implementing a step for producing, using the graph, vector graphical representations of the resultant image regions for the minimal cell.

Still referring to FIG. 9, at block 922, representations of the objects are stored for further use. The objects can be stored as a pattern that contains them as complete objects, similar to segmented objects 304 in FIG. 3. Alternatively, the objects can be stored as independent, individual graphical representations. The choice can be made due to a configuration setting of the graphic application 102, or a prompt can be issued to the user and the response can dictate how the individual graphical objects or stored. It is also possible for a series of prompts or a dialog to be issued that facilitates storing some objects independently while storing others as part of a pattern. Once all regions corresponding to one or more complete user facing objects are extracted into separate images, a pattern can be created post vectorization, where the pattern superimposes the objects onto one another using their relative placement offsets.

Figure 10:
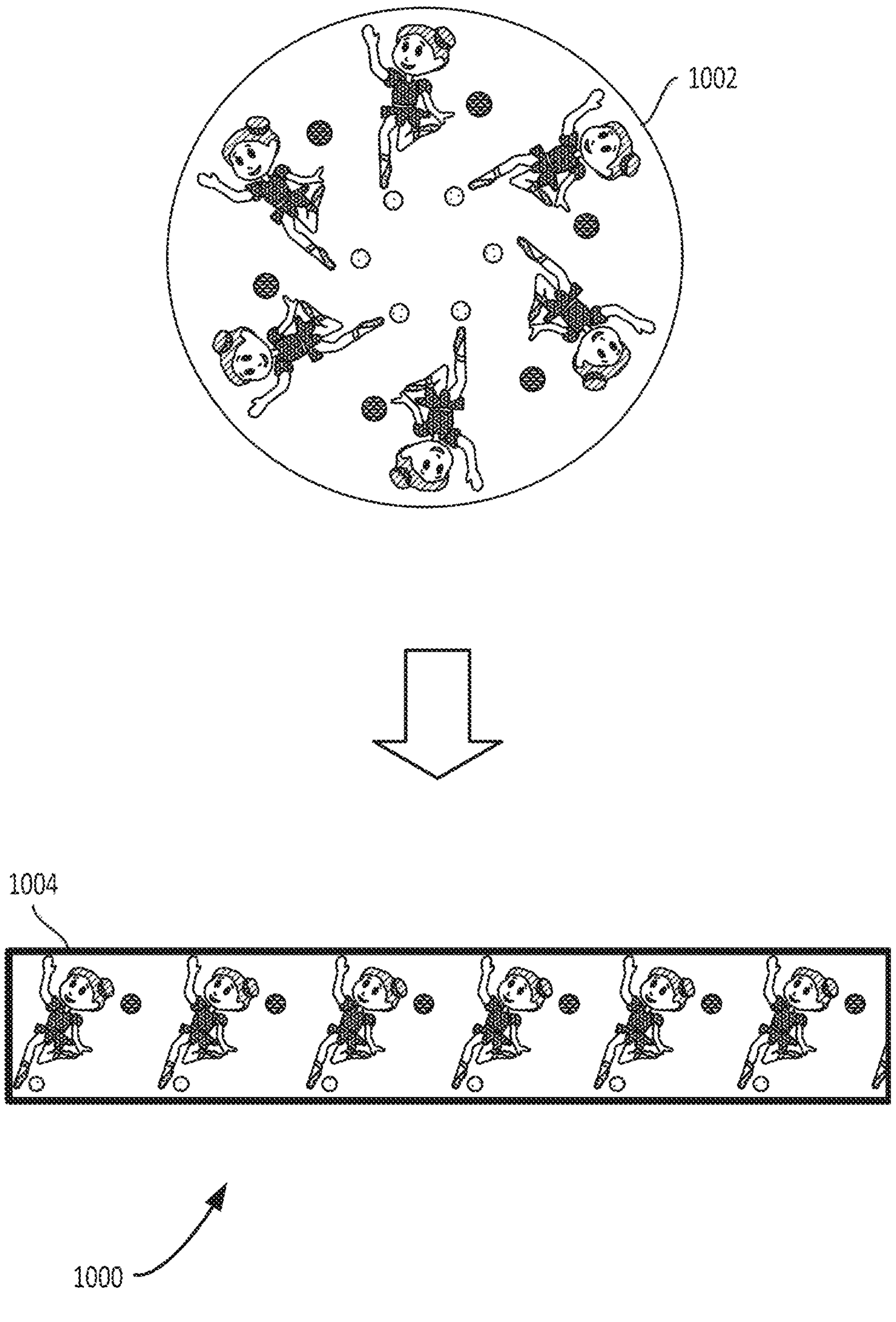
FIG. 10 shows an example of radially repeating pattern and illustrates its transformation to a linearly repeating pattern in order to isolate objects and potentially provide vector graphical representations of the objects according to certain embodiments.

FIG. 10 shows an example 1000 of a radially repeating pattern 1002 and illustrates its transformation to a linearly repeating pattern 1004 in order to process a minimal cell and potentially provide vector graphical representations of the objects in the pattern. Radial pattern 1002 in this example is selectively transformed into a pseudo grid pattern, which serves as the linearly repeating pattern. The pseudo grid pattern is then processed with grid pattern logic as already described herein. The unwrapped and isolated regions are computed in grid space. These objects can be mapped back to the radial domain in order to extract their user facing objects (i.e., isolated image regions). In order to accomplish this, the extents of each isolated region from grid space are converted to their polar domain equivalents. The rectangular minimal cell in grid (or cartesian) space corresponds to a pie shaped cell in the radial (or polar) domain, but individual isolated regions become curvy trapezoids when mapped to radial coordinates.

Figure 11:
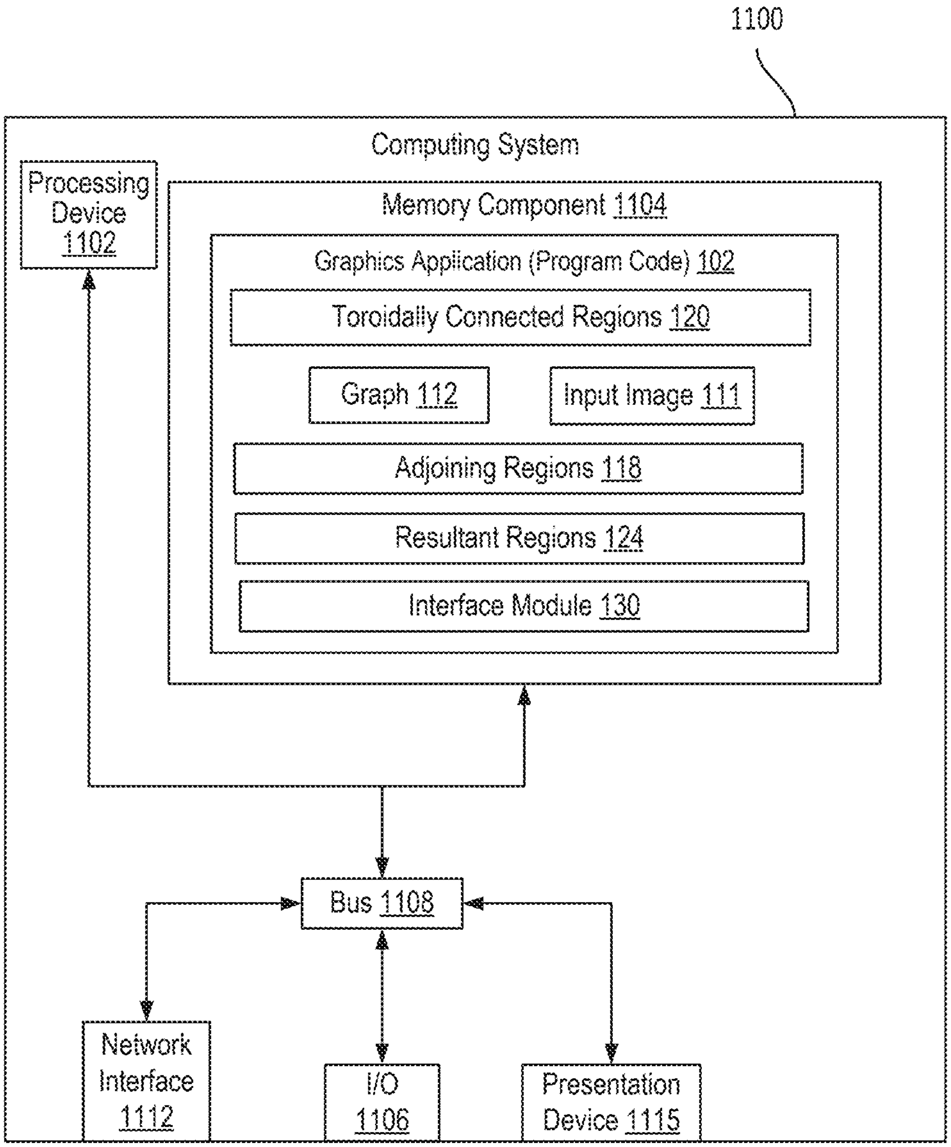
FIG. 11 is a diagram of an example of a computing system that segments repeating patterns in images to potentially provide vector graphical representations according to certain embodiments.

FIG. 11 is a diagram of an example of a computing system 1100 that provides segments repeating patterns in images to provide vector graphical representations according to certain embodiments. System 1100 includes a processing device 1102 communicatively coupled to one or more memory devices. The processing device 1102 executes computer-executable program code stored in the memory component 1104. Examples of the processing device 1102 include a microprocessor, an application-specific integrated circuit ("ASIC"), a field-programmable gate array ("FPGA"), or any other suitable processing device. The processing device 1102 can include any number of processing devices, including a single processing device. The memory component 1104 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, and JavaScript.

Still referring to FIG. 11, the computing system 1100 may also include a number of external or internal devices, for example, input or output devices. For example, the computing system 1100 is shown with one or more input/output ("I/O") interfaces 1106. An I/O interface 1106 can receive input from input devices or provide output to output devices (not shown). Output may be provided using the interface module 130 of the graphics application 102. One or more buses 1108 are also included in the computing system 1100. The bus 1108 communicatively couples one or more components of a respective one of the computing system 1100. The processing device 1102 executes program code that configures the computing system 1100 to perform one or more of the operations described herein. The program code includes, for example, graphics application 102 or other suitable applications that perform one or more operations described herein. The program code may be resident in the memory component 1104 or any suitable non-transitory, computer-readable medium and may be executed by the processing device 1102 or any other suitable processor. Memory component 1104, during operation of the computing system, can store the input image 111, and the graph 112. The toroidally connected image regions 120 for are also temporarily stored as part of graphics application 102. Both toroidally connected image regions and joined adjacent regions are included in resultant image regions 124.

The system 1100 of FIG. 11 also includes a network interface device 1112. The network interface device 1112 includes any device or group of devices suitable for establishing a wired or wireless data connection to one or more data networks. Non-limiting examples of the network interface device 1112 include an Ethernet network adapter, a wireless network adapter, and/or the like. The system 1100 can communicate with one or more other computing devices (e.g., another computing device executing other software, another computing device executing another copy or instance of the graphics application (not shown) via a data network (not shown) using the network interface device 1112. Network interface device 1112 can also be used to communicate with network or cloud storage used as a repository for designs as well as updated or archived versions of the vector graphics client application 102 for distribution and installation.

Staying with FIG. 11, in some embodiments, the computing system 1100 also includes the presentation device 1115. A presentation device 1115 can include any device or group of devices suitable for providing visual, auditory, or other suitable sensory output. In examples, presentation device 1115 displays input and/or rendered images. Non-limiting examples of the presentation device 1115 include a touchscreen, a monitor, a separate mobile computing device, etc. In some aspects, the presentation device 1115 can include a remote client-computing device that communicates with the computing system 1100 using one or more data networks. System 1100 may be implemented as a unitary computing device, for example, a notebook or mobile computer. Alternatively, as an example, the various devices included in system 1100 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "determining," "accessing," "generating," "processing," "computing," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform. Terms such as, "left," "right," "top," and "bottom," or the like are used to indicate relative position as figures are viewed and are not intended to be indicative of any actual positioning of objects or images with respect to each other.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:

segmenting an input image including a repeating pattern to identify input image regions of a minimal cell of the repeating pattern;

representing each input image region using a node of a graph and defining an edge between each pair of nodes that represents adjoining image regions;

identifying, using the graph, portions of toroidally connected image regions and portions of mergeable adjoining image regions of the minimal cell of the repeating pattern;

joining each portion of each mergeable adjoining image region and unwrapping each portion of each toroidally connected image region to produce a plurality of resultant image regions for the minimal cell; and rendering or storing each of the resultant image regions as a graphical object of the repeating pattern.

2. The method of claim 1, wherein the repeating pattern comprises either or both of a linearly repeating pattern or a radially repeating pattern.

3. The method of claim 2, further comprising transforming the radially repeating pattern to a pseudo grid pattern prior to segmenting the input image.

4. The method of claim 1, further comprising isolating each of the plurality of resultant image regions using a random color.

5. The method of claim 1, further comprising:

converting each of the resultant image regions to a vector graphical representation; and rendering or storing the vector graphical representation.

6. The method of claim 1, further comprising rendering or storing each of the resultant image regions in a pattern or as individual objects.

7. The method of claim 1, further comprising processing the minimal cell of the repeating pattern on a row-by-row or column-by-column basis to define the edge between each pair of nodes.

8. A system comprising:

a memory component; and a processing device coupled to the memory component, the processing device to perform operations comprising:

segmenting an input image including a repeating pattern to identify input image regions of a minimal cell of the repeating pattern;

representing each input image region using a node of a graph and defining an edge between each pair of nodes that represents adjoining image regions;

identifying, using the graph, portions of toroidally connected image regions and portions of mergeable adjoining image regions of the minimal cell of the repeating pattern;

joining each portion of each mergeable adjoining image region and unwrapping each portion of each toroidally connected image region to produce a plurality of resultant image regions for the minimal cell; and rendering or storing each of the resultant image regions as a graphical object of the repeating pattern.

9. The system of claim 8, wherein the repeating pattern comprises either or both of a linearly repeating pattern or a radially repeating pattern.

10. The system of claim 9, wherein the processing device additionally performs an operation of selectively transforming the radially repeating pattern to a pseudo grid pattern prior to segmenting the input image.

11. The system of claim 8, wherein the processing device additionally performs an operation of isolating each of the plurality of resultant image regions using a random color.

12. The system of claim 8, wherein the processing device additionally performs operations comprising:

converting each of the resultant image regions to a vector graphical representation; and rendering or storing the vector graphical representation.

13. The system of claim 8, wherein the processing device additionally performs an operation of selectively rendering or storing each of the resultant image regions in a pattern or as individual objects.

14. The system of claim 8, wherein the processing device additionally performs an operation of processing the minimal cell of the repeating pattern on a row-by-row or column-by-column basis to define the edge between each pair of nodes.

15. A non-transitory computer-readable medium storing executable instructions, which when executed by a processing device, cause the processing device to perform operations comprising:

generating a graph for a repeating pattern in an image, the graph configured to identify portions of toroidally connected image regions and portions of mergeable adjoining image regions of a minimal cell of the repeating pattern;

joining each portion of each mergeable adjoining image region and unwrapping each portion of each toroidally connected image region to produce a plurality of resultant image regions for the minimal cell; and rendering or storing vector graphical representations of the resultant image regions from the repeating pattern.

16. The non-transitory computer-readable medium of claim 15, wherein the repeating pattern comprises either or both of a linearly repeating pattern or a radially repeating pattern.

17. The non-transitory computer-readable medium of claim 16, wherein the instructions cause the processing device to selectively transform the radially repeating pattern to a pseudo grid pattern and to segment the image.

18. The non-transitory computer-readable medium of claim 15, wherein the instructions cause the processing device to isolate each of the resultant image regions using a random color.

19. The non-transitory computer-readable medium of claim 15, wherein the instructions cause the processing device to perform operations comprising:

converting each of the resultant image regions to a vector graphical representation; and rendering or storing the vector graphical representation.

20. The non-transitory computer-readable medium of claim 15, wherein the instructions cause the processing device to selectively render or store each of the resultant image regions in a pattern or as individual objects.

* * * * *